United States Patent [19]

Berniolles

[11] Patent Number: 5,318,216
[45] Date of Patent: Jun. 7, 1994

[54] METHOD FOR ASSEMBLING TWO PARTS MADE FROM METAL PLATE, METAL ASSEMBLY AND STRUCTURE MADE FROM ARMOUR PLATE WHICH ARE OBTAINED BY THIS METHOD

[76] Inventor: Jean Berniolles, 2, Avenue de la Tranquillité, 78000 Versailles, France

[21] Appl. No.: 131,556

[22] Filed: Oct. 4, 1993

Related U.S. Application Data

[63] Continuation of Ser. No. 903,338, Jun. 24, 1992, abandoned.

[30] Foreign Application Priority Data

Jun. 27, 1991 [FR] France ................. 91 07986

[51] Int. Cl.$^5$ ............................................. B23K 26/00
[52] U.S. Cl. ................................. 228/171; 228/196; 219/121.64; 219/121.72
[58] Field of Search ............. 228/170, 171, 176, 183, 228/196; 219/121.13, 121.14, 121.63, 121.64, 121.72, 121.82; 52/80

[56] References Cited

U.S. PATENT DOCUMENTS

| | | | |
|---|---|---|---|
| 3,440,711 | 4/1969 | Roper | 228/142 |
| 4,156,123 | 5/1979 | Fischer et al. | 228/182 |
| 4,634,832 | 1/1987 | Martyr | 219/121.64 |
| 4,883,937 | 11/1989 | Matsuno | 228/173.3 |

FOREIGN PATENT DOCUMENTS

| | | | |
|---|---|---|---|
| 0042146 | 12/1981 | European Pat. Off. | 228/142 |
| 134204 | 2/1979 | Fed. Rep. of Germany | 228/142 |
| 834916 | 12/1938 | France . | |
| 112690 | 7/1983 | Japan | 228/142 |

OTHER PUBLICATIONS

Metals Handbook Ninth Edition, vol. 6, "Electron Beam Welding", pp. 609–646, copyright 1983.
Metals Handbook Ninth Edition, vol. 6, "Laser Beam Welding", pp. 647–671, copyright 1983.
Metals Handbook Ninth Edition, vol. 14, "Laser Cutting", pp. 735–742, copyright 1988.
Patent Abstracts of Japan, vol. 9, No. 7 (M–350) (1730), Jan. 12, 1985, & JP-A-59 156 585, Sep. 5, 1984, Yasuaki Sugie, et al., "Electron Beam Welding Method".

Primary Examiner—Samuel M. Heinrich
Attorney, Agent, or Firm—Oblon, Spivak, McClelland, Maier & Neustadt

[57] ABSTRACT

At least one chamfer (10, 11) is produced on each of the parts (2, 3) to be assembled, which chamfer is inclined in relation to the faces of the part, along one of its edges. The chamfer (10, 11) may be produced during the cutting out of the part (2, 3) in a metallic plate. The parts are placed in assembly position with their chamfers (10, 11) in contact over a bearing plane. The parts (2, 3) are welded in a single pass over the bearing plane using a method such as laser or electron-beam welding. The method enables, in particular, the assembly of armour plates to be carried out.

5 Claims, 1 Drawing Sheet

METHOD FOR ASSEMBLING TWO PARTS MADE FROM METAL PLATE, METAL ASSEMBLY AND STRUCTURE MADE FROM ARMOUR PLATE WHICH ARE OBTAINED BY THIS METHOD

This application is a continuation of application Ser. No. 07/903,338, filed on Jun. 24, 1992, now abandoned.

The present invention relates to the assembly of two polygon-shaped parts obtained by cutting out a metal plate, such as armour plate made from steel having a very high hardness.

Armour plates made from steel having very high hardness (hardness greater than 360 Brinell) are weldable only with very great difficulty. In order to produce assemblies, after having cut out the metal plates into the desired shapes, they are placed in assembly position and a weld is made with an austenitic filler metal in order to reduce the risks of cold cracking. But such welded joints have a mechanical resistance approximately half that of the metal of the metal plates and they have poor projectile-impact resistance. In order to improve the impact resistance of such assemblies, at least one metal plate or part is brought to bear on the edge of another metal plate and the choice of the bearing surfaces must be made as a function of the line of fire of the projectiles against which it is desired to be protected.

This technique has several drawbacks.

First of all, it does not permit all geometries for assembly; next, it requires a specific preparation of the edges of the metal plates for each assembly; finally, the welding cannot be performed using computer-type means.

The object of the present invention is to provide a method for assembling two metal-plate parts, especially armour plate made from steel having a very high hardness, which permit all geometries, with a simple preparation of the edges of the metal-plate parts, which can be carried out using automatic means for computer-aided design and manufacture (CAD/CAM) and which has high projectile-impact resistance.

For this purpose, the subject of the invention is a method for assembling two polygon-shaped parts obtained by cutting out a metallic plate such as an armour plate made from steel of very high hardness, according to which:
- at least one plane chamfer, inclined in relation to the faces of the part, is made on each of the parts along at least one edge of the part,
- the parts are placed in assembly position, one chamfer of one of the parts coming into contact with one chamfer of the second part, over a bearing plane, and
- the parts are welded in a single pass, over the bearing plane, using a method of welding having a high energy-density, such as laser or electron-beam welding, without filler metal.

The bearing plane of the chamfers of two metal plates or of two contiguous parts is preferably the plane bisecting the dihedron formed by the two metal plates or the two parts.

The invention also relates to an assembly of two cut out parts in the metal plates, especially in armour plates made from steel having a very high hardness, in which the two parts constitute a dihedron and are joined by a weld bead, without filler metal, located in a plane within the dihedron formed by the parts, the weld bead involving the entire thickness of the parts.

With this method, it is possible to produce polyhedra of any shape having very high projectile-impact resistance.

The cutting out of the parts to be assembled is very simple, as is the welding, and these two operations are suitable for computer-aided design and manufacture means. In particular, they may be carried out by a robot such as a gantry arrangement having five axes of freedom.

In addition, the assembly is obtained by localised melting of the metal of the metal plates or parts such that the welded joint has the same projectile-impact resistance as the metal plates or parts.

The invention will now be described in more detail with respect to the attached drawings.

Figure 1:
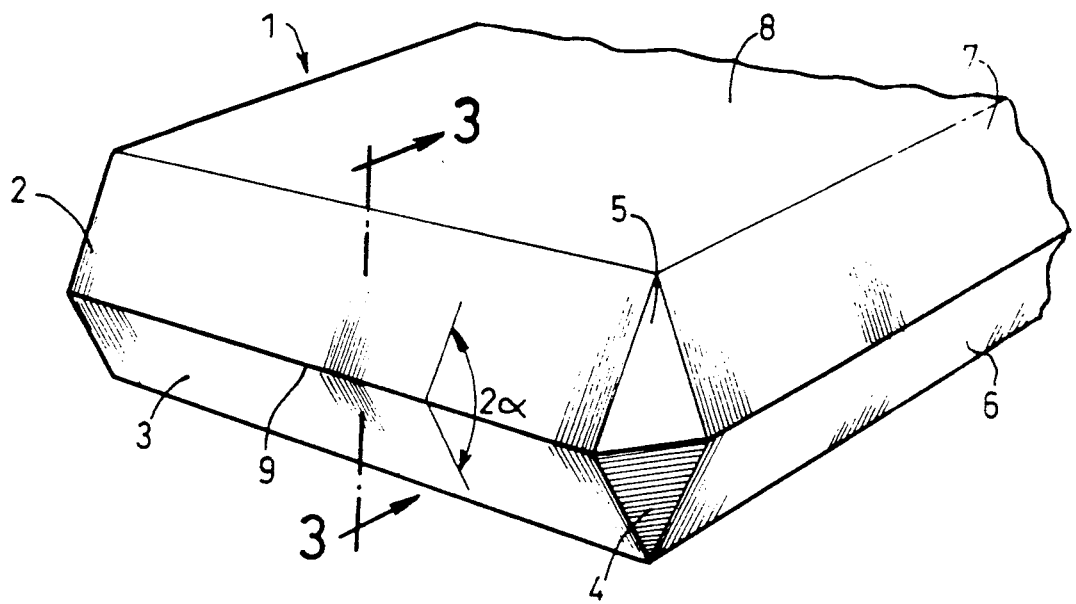
FIG. 1 is a view, in partial perspective, of a polyhedron assembled with the aid of the method according to the invention.
Figure 2:
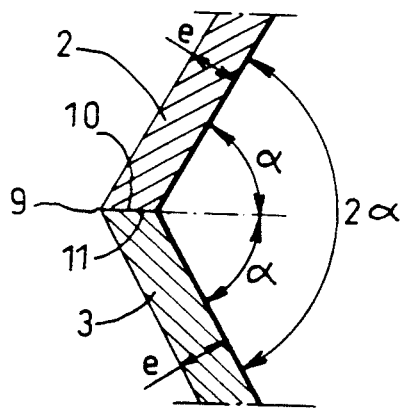
FIG. 2 is a view, in transverse cross-section, of two parts of the polyhedral structure which are placed in assembly position.

In order to manufacture armoured-vehicle hulls, polyhedral structures are required to be produced, such as the structure designated in its entirety by the designation 1 in FIG. 1. The faces of this polyhedron 1 are plane polygons 2, 3, 4, 5, 6, 7, 8. Two contiguous faces 2, 3 are adjoining along a ridge 9 and form a dihedron of apex angle $2\alpha$. The faces 2, 3, 4, 5, 6, 7, 8 are polygonal parts cut out in metal plates of thickness generally between 2 mm and 20 mm. On account of the thickness of the metal plates, in order for two contiguous parts 2, 3 to adjoin well, it is necessary to provide a chamfer of suitable angle on the edge of each part. A simple geometrical construction enables the angle which each chamfer has to make with the surfaces of the part to be determined. In particular, as shown in FIG. 2, when all the parts have the same thickness e, each chamfer 10, 11 corresponding to the ridge 9 of a dihedron of apex angle $2\alpha$ makes an angle $\alpha$ with the surface of each part. Thus it is said that the chamfer is located in the plane bisecting the dihedron.

In order to produce a polyhedral assembly, the parts 2, 3, 4, 5, 6, 7, 8 are firstly cut out to the dimensions desired by making an oblique cut, that is to say inclined in relation to the perpendicular to the surface of the metal plate. This oblique cut enables the chamfer to be produced directly. In particular, when the cut is produced by a laser cut, the geometrical quality and the surface state of the edges of the parts obtained enables them to be assembled directly without further machining. In addition, the geometrical definition of the parts is simple, since it corresponds to a polygonal perimeter and, for each ridge, to an inclination of the cut which is easy to determine. This geometrical simplicity permits recourse to design with the aid of computer-aided design methods and it is possible to cut out the metal plates by using numerically-controlled machines.

After having cut out the parts, they are put into assembly position according to a set-up where they constitute the polyhedron which it is desired to produce. The parts are adjoined and come to bear by means of their chamfers 10, 11, as shown in FIG. 2. They are held in place by a tool which the person skilled in the art knows how to produce. This tool leaves all the ridges free.

Once assembled, the parts are laser or electron-beam welded. In order to achieve this, a laser beam or an electron beam is directed over the bearing plane formed by two contacting chamfers of the assembly and all the edges are travelled along by the beam.

When the beam comes into contact with the junction zone between two parts, it penetrates between the chamfers and melts the metal locally throughout the entire thickness of the parts. Small quantities of liquid metal arising from each of the parts mix together. As the beam moves, the molten zone moves with it. The metal which was molten and which no longer receives the beam solidifies and forms a connection between the two parts. By travelling along all the ridges, a complete connection is thus created between the various parts. This connection has the same chemical composition and the same mechanical properties as the metal which constitutes the parts.

Figure 3:
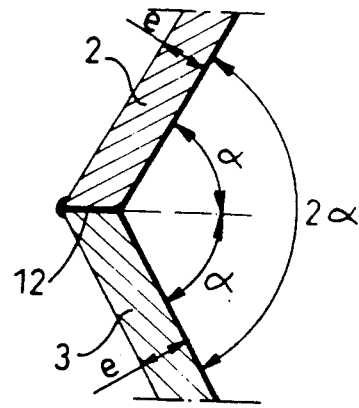
FIG. 3 is a view, in cross-section along 3—3 of FIG. 1, of two parts assembled by welding.

As may be seen in FIG. 3, parts 2, 3 or plates are thus obtained which are joined by a weld bead 12 located in the plane initially formed by the chamfers 10, 11 shown in FIG. 2, that is to say the plane bisecting the dihedron formed by the contiguous parts. This weld bead involves the entire thickness of the parts or metal plates.

It will be easily understood that if the two contiguous parts or metal plates do not have the same thickness, the plane of connection of the two parts or metal plates may be different from the plane bisecting the dihedron, but it remains a plane within the said dihedron.

I claim:

1. A method for making a polyhedron-shaped metal structure constituted by polygon-shaped metal plate parts comprising the steps of:
   cutting out of metal plates the polygon-shaped parts,
   providing on each of the parts inclined chamfers along the edges of the part,
   placing the parts in an assembly position for obtaining the polyhedron-metal shaped metal structure, in which the parts come into contact with one another through the chamfers,
   welding the parts together in a single pass over bearing planes of the chamfers by directing and displacing a laser beam along each of the bearing planes, without filler metal.

2. A method according to claim 1 wherein the chamfers are provided during the cutting out of the parts.

3. A method according to claim 2, characterized in that the cutting out of the parts is carried out by a laser.

4. A method according to any one of claims 1, 2 or 3 wherein each of the bearing planes of the chamfers of the parts is the plane bisecting the dihedron formed by the chamfers coming into contact along the bearing plane.

5. A method according to claim 1, wherein the parts are cut out of a metal plate made of armour steel having a hardness greater than 360 Brinell.

* * * * *